United States Patent [19]

Frey et al.

[11] 4,113,805

[45] Sep. 12, 1978

[54] THERMOPLASTIC COMPOSITIONS COMPRISING PVC AND CHLORINATED POLYETHYLENE

[75] Inventors: Hans-Helmut Frey, Bad Soden am Taunus; Helmut Klug, Aystetten, both of Fed. Rep. of Germany

[73] Assignee: Hoechst Aktiengesellschaft, Frankfurt am Main, Fed. Rep. of Germany

[21] Appl. No.: 849,161

[22] Filed: Nov. 7, 1977

Related U.S. Application Data

[63] Continuation of Ser. No. 635,326, Nov. 26, 1975, abandoned.

[30] Foreign Application Priority Data

Nov. 28, 1974 [DE] Fed. Rep. of Germany ....... 2456278

[51] Int. Cl.² ............................................. C08L 23/28
[52] U.S. Cl. ........................ 260/897 C; 260/45.75 W; 260/895; 526/22; 526/45

[58] Field of Search ..................... 260/897 C

[56] References Cited

U.S. PATENT DOCUMENTS

| | | | |
|---|---|---|---|
| 3,291,863 | 12/1966 | Frey et al. ............................ | 260/897 |
| 3,407,171 | 10/1968 | Segre ...................................... | 260/41 |
| 3,467,732 | 9/1969 | Schnebelen et al. ................ | 260/897 |

*Primary Examiner*—Carman J. Seccuro
*Attorney, Agent, or Firm*—Connolly and Hutz

[57] ABSTRACT

Blends of vinyl chloride polymers and chlorination products of polyolefins well suitable for dry blend technique are obtained by using a chlorinated low pressure polyethylene with a chlorine content of 38 to 42% by weight, a residue value of 55 to 70% by weight and a swelling value of less than 1% by weight, prepared from high-density polyethylene, having a density of 0.955 to 0.965 g/cm³, a melting index of 20 to 65 g/10 min and a reduced specific viscosity of 1 to 2 dl/g, under certain conditions.

5 Claims, No Drawings

THERMOPLASTIC COMPOSITIONS COMPRISING PVC AND CHLORINATED POLYETHYLENE

This application is a continuation of application Ser. No. 635,326 filed Nov. 26, 1975 now abandoned. su It is known that polyvinyl chloride and vinyl chloride copolymers may be elastified by an addition of chlorination products of polyolefins obtained by chlorination of polyolefins in aqueous suspension, optionally in the presence of hydrochloric acid, silicic acid and siloxane oil and having a chlorine content of from 25 to 50% by weight.

Chlorination products having an especially good elastifying effect are obtained by chlorinating a high-density polyethylene having a density of from 0.940 to 0.955 g/cm$^3$ at temperatures at least above 120° C. during the last chlorination stage. In this process a high degree of "through chlorination" of the polyolefin is obtained being substantial for the elastifying effect. The through chlorination is determined by the following methods:

1. residue value according to the toluene/acetone method (TAc):
   4 grams of the chloropolyethylene to be tested are refluxed for 1 hour in 100 ml of a mixture of toluene and acetone (1:1). The amount of the insoluble residue consisting of insufficiently chlorinated portions in a measure for the through chlrination of the polyethylene grain. The lower the residue, the more suitable is the chlorination product for elastifying polyvinyl chloride.

2. swelling value in methylcyclohexane (MCH):
   The increase in weight of a sample after a 24-hour storage in methyl-cyclohexane is likewise a measure of the through chlorination of the polyethylene grain. Insufficiently chlorinated portions swell very little. Products having a high swelling value are especially suitable for elastifying PVC.

Chlorinated high-density polyethylenes having a chlorine content of about 39% which have been prepared under the conditions indicated above have TAc values of less than 40% by weight and MCH values of more than 10% by weight. Mixtures of PVC with such chloropolyethylenes have an excellent impact resistance, but a bad transparency. The transparency of a mixture of 80% by weight of S-PVC of a K value of 70 and 20% by weight of a chlorinated polyethylene having the above indicated properties is about 70%, whereas that of a pure S-PVC is about 88 to 90%.

A good transparency is, however, essential for a number of applications. For outdoor application, for example, for corrugated plates and for profiles for light permeable walls there is required a material having a good transparency and a high resistance to ageing and to atmospheric corrosion in addition to a good impact resistance. Transparency and resistance to atmospheric rrosion are of such essential importance, that they may be aquired at the expense of a part of the possibly obtainable impact resistance. An impact resistance allowing preparing and setting up the profiles and plates will be high enough, as said parts are no longer exposed to considerable mechanical stress under normal conditions, when set up.

There is consequently a need for a material having an improved impact resistance as compared to PVC and nevertheless, if possible, the same good transparency and moreover a resistance to atmospheric corrosion as high as possible.

A series of attempts have been made for improving the transparency of mixtures of PVC with chloropolyolefins. Japanese Patent Application No. Sho 68/24 536, for example, discloses impact resistant and transparent mixtures comprising of from 95 to 85% by weight of PVC and 5 to 15% by weight of a chlorinated polyolefin that has a chlorine content of 20 to 45%, and that has been prepared by chlorinating a high-density polyethylene having a branching coefficient of from 5 to 30 and a molecular weight of from 20,000 to 200,000 at temperatures below 90° C. in aqueous suspension. The corresponding branched high-density polyethylenes have a density of from 0.940 to 0.945 as it can also be seen from the indication in the examples of the Japanese Patent Specification. The impact resistance of the described mixtures should be in the range of from 4 to 7.5 kgcm/cm$^2$ and the transparency of about 95%, calculated on S-PVC, the proportion of PVC to chlorinated polyethylene being 90% to 10%. When using a polyethylene of a lower branching coefficient, i.e. of a higher density, the transparency as well as the impact resistance are said to be worse.

For a series of technical applications the transparency obtainable according to the cited reference, however, is insufficient.

It is an aim of the present invention to develop a thermoplastic composition of a VC polymer and a chlorinated high density polyethylene exhibiting an improved transparency and in most cases also an improved impact resistance as compared to the products according to said Japanese Patent Specification.

This has been achieved according to the present invention, by adding to the VC polymer a chlorinated polyethylene prepared by chlorinating a high density polyethylene having a low branching coefficient and a high density, at temperatures at least partially below 90° C. and which chlorinated polyethylene has a TAc of from 55 to 70 and a MCH of less than 1% by weight.

The present invention consequently provides a thermoplastic composition consisting of (a) 95 to 70% by weight of a vinyl chloride polymer and (b) 5 to 30% by weight of a chlorinated high-density polyethylene, wherein the chlorinated high-density polyethylene has a chlorine content of from 38 to 42% by weight, a residue value of from 55 to 70% by weight (determined by extraction with toluene-/acetone in a ratio of 1:1) and a swelling value of less than 1% by weight (measured in methylcyclohexane) and has been prepared from a high-density polyethylene having a density of from 0.955 to 0.965 g/cm$^3$, a melting index MFI 190/5(DIN=German Industrial standard no. 53 735) of from 20 to 65 g/10 min. and a reduced specific viscosity (measured according to ISO/R 1191 with a 0.1% solution in decahydronaphthalene at a temperature of 135° C.) of from 1 to 2 dl/g by chlorination in water or in hydrochloric acid in the presence of 0 to 2% by weight of silicic acid and 0 to 1% by weight of siloxane oil, each time calculated on the high-density polyethylene used, at temperatures of from 50° to 120° C., while introducing at least the last 10% of chlorine at a temperature of from 110° to 120° C.

The present invention moreover provides a process for preparing a thermoplastic composition by mixing (a) 95 to 70% by weight of a vinyl chloride polymer with (b) 5 to 30% by weight of a chlorinated high-density polyethylene, which comprises using a chlorinated high-density polyethylene that has a chlorine content of from 38 to 42% by weight, a residue value of from 55 to 70% by weight (determined by extraction with toluene/acetone in a ratio of (1:1) and a swelling value of less than 1% by weight (measured in methylcyclohexane) and that has been prepared from a high-density polyethylene having a density of from 0.955 to 0.965 g/cm$^3$, a melting index MFI 190/5 (DIN 53 735) of from 20 to 65 g/10 min. and a reduced specific viscosity (measured according to ISO/R 1191 with a 0.1% solution in decahydronaphthalene at a temperature of 135° C.) of from 1 to 2 dl/g by chlorination in water or in hydrochloric acid in the presence of 0 to 2% by weight of silicic acid and 0 to 1% by weight of siloxane oil, each time calculated in the high density polyethylene used, at temperatures of from 50° to 120° C., while adding at least the last 10% of chlorine at a temperature of from 110° to 120° C.

The thermoplastic composition according to the invention consists of 95 to 70% by weight, preferably of 90 to 80% by weight of a vinyl chloride homopolymer or a copolymer of vinyl chloride with further comonomers. Examples of comonomers are olefins, for example, ethylene or propylene, vinyl esters of straight chain or branched carboxylic acids having of from 2 to 20, preferably of from 2 to 4 carbon atoms, for example, vinyl acetate, propionate, butyrate, 2-ethyl hexoate, stearate or vinylisotridecanoic acid ester; vinyl halides, for example, vinyl fluoride, vinylidene chloride or bromide; vinyl ethers, for example, vinylmethyl ethers; vinyl pyridine; unsaturated acids, for example, maleic, fumaric, acrylic, methacrylic acid and their mono- or diesters with mono- or dialcohols having of from 1 to 10 carbon atoms; maleic acid anhydride, maleic acid imide as well as its N-substitution products with aromatic, cycloaliphatic as well as optionally branched aliphatic substituents; acrylo-nitrile, styrene. Mixtures of these monomers may also be used.

The quantity of comonomer units in the VC copolymer may be up to 20% by weight, preferably of from 1 to 5% by weight.

The K value of the VC polymers used according to the invention advantageously is in the range of from 30 to 80, preferably of from 50 to 75.

The remaining 5 to 30% by weight, preferably 10 to 20% by weight of the thermoplastic composition consist of the chlorinated high-density polyethylene to be used according to the invention, which is fine grained and can readily be mixed homogenuously with vinyl chloride polymer powders. Its chlorine content is in the range of from 38 to 42% by weight, preferably of from 39 to 41% by weight and its residue value of from 55 to 70% by weight, preferably of from 56 to 65% by weight. Its swelling value is below 1% by weight, preferably in the range of from 0.3 to 0.8% by weight. The reduced specific viscosity is in the range of from 1 to 2 dl/g, preferably of from 1.0 to 1.5 dl/g.

The mixtures according to the invention have a content of 20% chloropolyethylene, a transparency of from 95 to 99%, calculated on pure S-PVC, whereas the notched impact strength according to DIN 53 453 of a 90/10 mixture is greater than 6, in most cases even greater than 7 kg cm/cm$^2$. The transparency nearly corresponds to that of the pure S-PVC, although the less favorable 80/20 mixture had been used deliberately for its determination in order to demonstrate more clearly the attained improvement. The mixtures according to the invention moreover have a very good resistance to atmospheric corrosion, when adequately stabilized.

The chlorinated high-density polyethylene used according to the invention is prepared by chlrinating finely divided high-density polyethylene, which may optionally be tempered or pre-sintered at a temperature of 100° C. to the crystallite melting point of the corresponding polyethylene for a period of preferably 5 to 300 minutes, in water or in aqueous hydrochloric acid having a concentration of up to 35%, preferably of from 10 to 35% (advantageously in the 3- to 30-fold quantity of hydrochloric acid, calculated on the high-density polyethylene), at a temperature of from 50° to 120° C., while introducing at least the last 10% of chlorine at a temperature of from 110° to 120° C. Chlorination is advantageously carried out in the following manner: it is started at a temperature in the range of from 50° to 100° C., preferably of from 70° to 90° C., continued while continuously increasing the temperature and terminated at a temperature in the range of from 110° to 120° C., preferably of from 115° to 120° C. It is likewise possible to perform chlorination in two steps, i.e., to start at a temperature of from 50° to 100° C., preferably of from 70° to 90° C., to increase the temperature while stopping the chlorine supply to 110° to 120° C., preferably to 115° to 120° C. and to continue chlorination until it is terminated or to carry out the whole chlorination at a temperature of from 110° to 120° C.

In these processes it is only essential, as already mentioned above that at least the last 10% by weight, preferably at least the last 20% by weight of chlorine are introduced at a temperature of from 110° to 120° C.

The high-density polyethylene used as the starting material for preparing the second component of the thermoplastic comparition according to the invention exhibits a density in the range of from 0.955 to 0.965 g/cm$^3$, a melting index MFI 190/5 (DIN 53 735) of from 20 to 65, preferably of from 40 to 55 g/10 min. and a reduced specific viscosity (measured according to ISO/R 1191 with a 0.1% solution in decahydronaphthalene at 135° C.) of from 1 to 2 dl/g, preferably of from 1.2 to 1.7 dl/g.

By silicic acid which may be present in the chlorination process as agglomeration inhibitor, there are to be understood the various hydrous or anhydrous types of the finely porous silicon dioxide preferably having a large surface, the surface whereof should be suitably in the range of from 50 to 400 cm$^2$/g, preferably of from 150 to 300 cm$^2$/g (according to BET). The average particle size of the silicic acid generally is in the range of from 1 to 50 μm.

The organo-silicon compounds or siloxane oils are liquid polysiloxanes consisting of the recurring unit

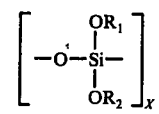

in which $R_1$ and $R_2$ each represents an alkyl radical preferably having of from 1 to 12 carbon atoms, an aryl radical, having preferably of from 6 to 10 carbon atoms or an aralkyl radical having from 7 to 12 atoms and X is an integer of from 10 to 10,000, preferably from 100 to 1,000. Compounds of the dimethylpolysiloxane series have proved to be especially efficient. There may further be mentioned, by way of example, diethyl, dipropyl, methylethyl, dioctyl, dihexyl, methylpropyl, dibutyl and didodecyl-polysiloxanes. The viscosity advantageously is in the range of from 1000 to 500,000 centistokes and especially of from 1000 to 60,000 centistokes.

The antiagglomeration effect of hydrochloric acid is improved by adding simultaneously silicic acid an soloxane oil. Such an addition is therefore preferred. In general 0.1 to 2% by weight, preferably of from 0.1 to 1% by weight of silicic acid in combination with 0.01 to 1.0, preferably of from 0.02 to 0.7% by weight of siloxane oils, each time calculated on the high-density polyethylene used, are sufficient. The amount of silicic acid and siloxane oil is not strictly limited, in some cases higher amounts may also be used, whereby the agglomeration effect is further improved, but then certain disadvantages for the blend with PVC must be taken into consideration.

The silicic acid component and the polysiloxane which may be possibly pre-mixed are expediently added prior to or at the beginning of the chlorination. According to another method of operating the silicic acid is firstly added alone and the siloxane oil is then admixed in the course of the chlorination. A possible slight agglomeration can be counter-acted at least partially by the later addition of siloxane oil, even if performed just before drying. It is also possible, of course, to add the intended amount of siloxane oil in portions during some or all process steps.

The thermoplastic composition according to the invention may contain additionally known processing auxiliaries such as heat or light stabilizers, UV absorbers, lubricants, dyestuffs, pigments as well as antistatic agents.

Suitable heat or light stabilizers are tin compounds, for example, mono- or dialkyl tin compounds having from 1 to 10 carbon atoms in the alkyl radical, wherein the remaining valencies of the tin are saturated by oxygen and/or sulfur atoms or by radicals containing oxagen and/or sulfur, for example, dibutyl tin bis-thioglycolic acid octyl ester; lead compounds, for example, salts with organic acids, for example, aliphatic carboxylic acids or hydroxycarboxylic acids as well as with mineral acids, for example basic or neutral lead salts of sulfuric or phosphorous acid; salts of the alkaline earth metals as well as of zinc, barium, cadmium with aliphatic carboxylic acids or hydroxy carboxylic acids, for example, the known barium/cadmium laurates; aminocrotonic acid esters, urea and thiourea derivatives, such as monophenyl urea and diphenyl thiourea, furthermore α-phenylindol and epoxides, for example, epoxidized soy bean oil.

The stabilizers preferably are added in an amount of from 0.2 to 5% by weight, calculated on the total mixture; they may also be used in admixture with one another as well as with antioxidants, for example, bisphenol A or alkyl substituted hydroxyl compounds, for example, ditertiary-butyl paracresol, tertiary-butyl hydroxy anisol, polyalcohols, for example, pentaerithrite, furthermore organophosphorous acid esters, for example, diphenyl octylphosphite or trisnonylphenyl phosphite.

For improving the light stability substances absorbing the UV light, for example, benzophenone or benztriazol derivatives, for example, 2-(2′hydroxy-5′methyl-phenyl)-benztriazol or 2-(2′hydroxy-3′-tertiary-butyl-5′-methylphenol)-5-chloro-benztriazol may be added to the mixtures.

As lubricants there may be used one or several higher aliphatic carboxylic acids and hydroxycarboxylic acids as well as their esters and amides, for example, stearic acid, montanic acid, glycerin monooleate, bis-stearyl or bis-palmitoyl ethylenediamine, montanic acid esters of ethanediol or 1,3-butanediol, fat alcohols having more than 10 carbon atoms, as well as their ethers, low molecular weight polyolefins, hard paraffins, in an amount of from advantageously 0.1 to 6% by weight, calculated on the total mixture.

Suitable pigments, for example, are titanium dioxide, barium sulfate, soot, as well as further heat resistent mineral and organic pigments.

With regard to the addition of further substances which have not been mentioned here please refer to the monographie of Helmut Kainer "Polyvinylchlorid und Vinylchlorid-Mischpolymerisate," Springer editions, Berlin, Heidelberg, New York, 1965, pages 209 to 258 and 275 to 329.

The thermoplastic composition according to the invention may be used, depending on the proportion of the chlorinated high-density polyethylene, for making profiles, plates, sheets, injection molded parts and other shaped articles. By virtue of the homogeneity of its fine grain it may be readily processed by the dry blen technique. Mixing of the components in the plasticated state may be dispensed with. The mixtures is used preferably in cases where a good transparency and resistance to atmospheric corrosion are required.

The following examples illustrate the invention.

EXAMPLES 1 to 3 and Comparative Examples A to E 90 liters of water or of 20% hydrochloric acid respectively were introduced into a 150 liter enamelled vessel, 11,3 kg of polyethylene were added while stirring and the air was evacuated. The suspension then was heated to 70° C. and 5.9 kg of chlorine were added while stirring over a period of 1 to 2 hours while further heating to 90° C. The reaction temperatures then were increased as indicated in the following table and 8.7 kg of chlorine were introduced in the course of 2 and a half hours. After cooling and expanding the reaction mixture was filtered off with suction, washed several times, filtered and dried at 75° C. About 17 kg of chlorination product having the chlorine content indicated in the table were obtained each time.

For determining the transparency 80 parts by weight of S-PVC of a K value of 70 and 20 parts by weight of the various chlorinated polyethylenes were mixed each time while adding 2 parts by weight of dibutyl tin bis-thioglycolic acid octyl ester, rolled at 175° C. for 10 minutes and the plates having a thickness of 4 mm were molded from the rough sheets obtained at a temperature of 180° C. For determining the transparency the portion in percent of passing light rays of a day-light lamp was measured. This portion in percent or directly the light transmittance calculated on PVC (transparency of from 88 to 90%) can be used as a measure for the transparency.

For determining the nothed impact strength according to DIN 53 453 90 parts by weight of S-PVC of a K value of 70 and 10 parts by weight of the various chlorinated polyethylenes were mixed each time while adding 1 part by weight of diphenyl octylphosphite and 3 parts by weight of a complex barium/cadmium stabilizer (consisting of 80% of barium/cadmium laurate, 14% of pentaerythrite and 6% of bisphenol A), rolled as described above and plates of a thickness of 4 mm were molded from the rolled sheets obtained. The required test specimens were prepared from the compressed plates. The following table indicates the results obtained: It can be seen therefrom that an optimal transparency could not be obtained when using a high-density polyethylene having a density of 0.95 g/cm³ (Examples A and B); the same applies to a high-density polyethylene having a density of 0.96, which had been chlorinated to a chlorine content of 36.1% or 44.8% by weight or to a chlorine content of 39.2% by weight at too high temperatures (Examples C to E). The required properties, i.e., a high residue value and a low swelling value could only be obtained when using under the conditions of the invention the high-density polyethylene having a density of 0.96. Consequently mixtures with PVC may be prepared therefrom, having an excellent transparency and a good impact resistance.

EXAMPLE 4

For demonstrating the good light stability 90 parts by weight of S-PVC of a K value of 70 and 10 parts by weight of chlorinated high density polyethylene that had been prepared from a polyethylene of a density of 0.96 g/cm³, a melting index MFI 190/5 of 48 g/10 min. and a reduced specific viscosity RSV of 1.3 dl/g by chlorination in water in the presence of 0.3% by weight of silicic acid having an average particle size of 12 μm and an inner surface according to BET of 200 cm²/g and 0.03% by weight of dimethylpolysiloxane having a viscosity of 1000 centistokes, each time calculated on the quantity of polyethylene an that had a chlorine content of 38.7% by weight, a TAc value of 58% by weight and a MCH value of 0.8% by weight were granulated on the rolls at 170° C. while adding 1.5 part by weight of the complex barium/cadmium laurate stabilizer, 0.5 part by weight of diphenyl phosphite, 2 parts by weight of epoxidized soy bean oil and 1 part by weight of distearylphthalate and injection molded in a 45 extruder, yielding a profile for roller shutters having a thickness of 1 mm. In comparison, the profile prepared from the same S-PVC in the same extruder, but without the addition of chlorinated polyethylene was extruded.

After exposure to light in a fadeometer (carbon filament lamp) for a period of 5000 hours the profile for roller shutters made of the mixture according to the invention did not manifest any discoloration, whereas the profile for roller shutters of pure PVC exhibited a clear tinge of brown.

EXAMPLE 5

Polyethylene was chlorinated under the conditions of Examples 1 to 3, but by effecting the total chlorination in one step. The time of chloration was 3 hours.

For determining the transparency it was operated in the manner described in Examples 1 to 3. The results obtained can be seen from the following table.

| | polyethylene | | | | | | | | transparency of 80/20 mixture calculated on | | notched impact strength of 90/10 mixture |
|---|---|---|---|---|---|---|---|---|---|---|---|
| | density | RSV | MFI 190/5 | | chlorination | chlorine | TAC | MCH | | | |
| | DIN 53 479 | ISO/R 1191 | DIN 53 735 | chlorination | temp. | content | value | value | incident | | DIN |
| Ex. | g/cm³ | dl/g | g/10 min | medium | 2nd stage °C | % by weight | % by weight | % by weight | light % | PVC % | 53 453 kgcm/cm² |
| A | 0.95 | 1.5 | 29 | water | 120 | 39.3 | 44 | 8 | 81 | 91 | 24.3 |
| B | 0.95 | 1.5 | 29 | 20% HCl | 118 | 39.7 | 46 | 3 | 83 | 93 | 15.5 |
| 1 | 0.96 | 1.3 | 46 | water | 118 | 40.2 | 66 | 0.8 | 88 | 99 | 7.7 |
| 2 | 0.96 | 1.3 | 46 | 20% HCl | 115 | 40.2 | 62 | 0.6 | 88 | 99 | 7.1 |
| 3 | 0.96 | 1.5 | 23 | water | 117 | 38.9 | 58 | 0.7 | 86 | 97 | 7.8 |
| C | 0.96 | 1.5 | 23 | water | 120 | 44.8 | 36 | 2 | 76 | 85 | 7.9 |
| D | 0.96 | 1.3 | 46 | water | 120 | 36.1 | 49 | 6 | 81 | 91 | 22.5 |
| E | 0.96 | 1.5 | 23 | water | 124 | 39.2 | 43 | 4 | 80 | 90 | 11.9 |
| 5 | 0.96 | 1.3 | 46 | 20% HCl | 115 | 40.4 | 63 | 0.6 | 88 | 99 | 6.6 |

What is claimed is:

1. Thermoplastic composition consisting of
   (a) 95 to 70% by weight of a vinyl chloride polymer and
   (b) 5 to 30% by weight of a chlorinated high-density polyethylene, wherein the chlorinated high-density polyethylene has a chlorine content of 38 to 42% by weight, a residue value of 55 to 70% by weight (determined by extraction with toluene/acetone in a ratio of 1:1) and a swelling value of less than 1% by weight (measured in methyl-cyclohexane) and has been prepared from high-density polyethylene having a density of 0.955 to 0.965 g/cm³, a melting index MFI 190/5 (DIN 53 735) of 20 to 65 g/10 min. and a reduced specific viscosity (ISO/R 1191) of 1 to 2 dl/g, by chlorinating in water or hydrochloric acid in the presence of 0 to 2% by weight of silicic acid and 0 to 1% by weight of siloxane oil, each time calculated on the high-density polyethylene used, at temperatures of from 50 to 120° C., while introducing at least the last 10% of chlorine at a temperature of from 110° to 120° C.

2. Thermoplastic composition as claimed in claim 1, the high-density polyethylene whereof has been prepared at a temperature of from 110° to 120° C.

3. Thermoplastic composition as claimed in claim 1, the high-density polyethylene whereof has been chlorinated at a temperature beginning in the range of from 70° to 90° C. and ending in the range of from 110° to 120° C.

4. Process for preparing a thermoplastic composition by mixing
   (a) 95 to 70% by weight of a vinyl chloride polymer ans
   (b) 5 to 30% by weight of a chlorinated high-density polyethylene wherein there is used a chlorinated high-density polyethylene that has a chlorine content of 38 to 42% by weight, a residue value of 55 to 70% by weight (determined by extraction with toluene/acetone in a ratio of 1:1) and a swelling value of less than 1% by weight (measured in methylcyclohexane) and that has been prepared from a high-density polyethylene having a density of 0.955 to 0.965 g/cm³, a melting index MFI 190/5(DIN 53 735) of 20 to 65 g/10 min. and a reduced specific viscosity (ISO/R 1191) of 1 to 2 dl/g, by chlorinating in water or in hydrochloric acid in the presance of 0 to 2% by weight of silicic acid and 0 to 1% by weight of siloxane oil, each time calculated on the high-density polyethylene used, at a temperature of from 50° to 120° C., while introducing at least the last 10% of chlorine at a temperature of from 110° to 120° C.

5. Process as claimed in claim 4, which comprises using a high-density polyethylene which has been chlorinated at a temperature beginning in the range of from 70° to 90° C. and ending in the range of from 110° to 120° C.

* * * * *